United States Patent Office 3,022,263
Patented Feb. 20, 1962

3,022,263
PROCESS FOR THE MANUFACTURE OF PLASTICIZED POLYMERS OF VINYL CHLORIDE OR PLASTICIZED POLYMERS OF VINYLIDENE CHLORIDE
Ludwig Orthner, Horst Herzberg, and Hans Helmut Frey, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed July 18, 1957, Ser. No. 672,590
Claims priority, application Germany July 21, 1956
5 Claims. (Cl. 260—45.5)

The present invention relates to a process for the manufacture of plasticized polymers of vinyl chloride or copolymers containing preponderantly vinyl chloride.

In U.S. patent application Serial No. 630,724, filed on December 27, 1956, by Hans-Helmut Frey for: "Process for the Improvement of Plastic Masses on the Basis of Polyvinyl Chloride" there has already been described a process for improving plastic masses on the basis of polyvinyl chloride and copolymers of vinyl chloride by the admixture of chlorination products of hydrocarbons of high molecular weight. The chlorination products of hydrocarbons of high molecular weight are mixed with polyvinyl chloride in known manner, for example on a roller or an extruder etc. The improvement is especially favorable when chloropolyolefins are admixed having a rubber-elastic nature. Products of this kind are advantageously prepared by chlorinating hydrocarbons of high molecular weight, for example polyethylene, polypropylene, copolymers of propylene in homogeneous solution, for example in chloroform, carbon tetrachloride etc. When adding products of this kind to polyvinyl chlorides in the manner described above, it is necessary to isolate the chloropolyolefins from their solutions, which operation involves considerable disadvantages. In all processes of this kind, for example eliminating the solvent by means of steam or precipitating the dissolved chloropolyolefins with alcohols of low molecular weight, the chloropolyolefins, which are especially suitable due to their rubberlike properties, are obtained in the form of lumps or crusts that must be subsequently comminuted with considerable expenditure in time and energy. Also when applying special isolation steps such as spraying of the chloropolyolefin solution or the emulsions thereof, it is not possible to prevent the secondary agglutination of the rubber-like particles owing to the self-stickiness of the chloropolyolefins which is fairly pronounced in case only small amounts of solvent are contained in the product.

It is easy to understand that powdery polyvinyl chloride and a rubber-elastic chloropolyolefin which may have different particle sizes are difficult to homogenize in a technically fast and simple manner. Long rolling times at high temperatures are required whereby decompositions may occur.

Now we have found that plasticized polymers of vinyl chloride, vinylidene chloride and copolymers of vinyl or vinylidene chloride with each other or with monomeric compounds, such as methyl and ethyl acrylate, vinyl acetate and other monomers containing a single olefinic double bond, the copolymers preponderantly containing vinyl chloride, can be prepared by finely dispersing in an emulsion or a dispersion of polyvinyl chloride or the copolymers thereof a solution of a chlorinated or sulfochlorinated polyethylene or polypropylene or a suitable copolymer of ethylene and propylene in an organic solvent and subsequently eliminating the solvent. In this simple manner technically useful, non-sticky powders of chloropolyolefins and polyvinyl chloride or copolymers thereof are obtained when, for example, chloropolyolefins as obtained after the chlorination and dissolved in organic solvents, such as methylene chloride, chloroform or carbon tetrachloride, tetrachlorethane, benzene, toluene or mixtures thereof, are emulsified with suspensions or dispersions of polyvinyl chloride in water, if desired in the presence of suitable emulsifiers, for example anion or cation active emulsifiers of low molecular weight, such as alkali metal lauryl sulfonate, alkali metal salts of paran sulfonic acids, lauryl-trimethyl-ammonium chloride, non-ionic emulsifiers such as the etherification product of polyethylene glycol and a fatty alcohol, or emulsifiers of high molecular weight such as glue, tragacanth, polyvinyl alcohol, and the solvent is subsequently eliminated in suitable manner, for example by evaporation. It is surprising that by this step non-sticky powders are formed having a useful and uniform grain-size. It is especially remarkable that during the elimination of the solvent at temperatures at which the chloropolyolefins normally agglutinate the particles do not agglomerate to form larger aggregates.

These powders containing both components in a very uniformly distributed form can be used with advantage for the preparation of plastic mixtures, since prior to mechanically mixing the components by rolling or kneading considerably shorter times are required for homogenization due to the good plastic flow and thus the product is fairly preserved.

For the production of the powder various steps can be applied. It is possible for example to emulsify admixtures of dispersions or emulsions of vinyl chloride polymers with solutions of chloropolyolefins such as $CCl_4$ solutions and subsequently to eliminate the solvent, for example at elevated temperature, if desired under reduced pressure, suitably while stirring. It is likewise possible to prepare emulsions of polyvinyl chloride latices and chloropolyolefin solutions and to bring about polymer precipitation during the elimination of the solvent by the addition of salts, for example alkaline earth metal chloride, heavy metal chloride, such as lead chloride. It is furthermore possible to atomize emulsions of this kind with steam or other carrier gases such as air, nitrogen or carbon dioxide.

The dry polyvinyl chloride powders may likewise be introduced into solutions of chloropolyolefins and the solvent may be eliminated for example by atomization with hot gases such as air, nitrogen, carbon dioxide or steam. It is furthermore possible to free said solution of the solvent by introducing it into hot water, suitably while stirring. The steps mentioned can be carried out with the help of various apparatus and also in a continuous manner.

In case foams are formed during the elimination of the solvent which prevent a smooth distillation, said foams can be broken by the addition of suitable antifoam agents, for example silicone oils. Emulsifiers which may be present can be disactivated, for example by precipitation with suitable salts.

In the finishing processes described it is furthermore possible to add simultaneously plasticizers such as dioctyl phthalate, dyestuffs, filling agents and also stabilizers and to distribute them uniformly in the polyvinyl chloride together with the chloropolyolefins.

The following examples serve to illustrate the invention but they are not intended to limit it thereto, the parts being by weight.

*Example 1*

A mixture of 2000 parts of polyvinyl chloride powder having a K-value of 70, 10 parts of sodium sulfonate containing 12 carbon atoms, 5 parts of sodium carbonate and 7000 parts of distilled water is uniformly stirred in an enamel-lined vessel and mixed with 7000 parts of a solution of 7.1 parts of chlorinated low pressure polyethylene (prepared by chlorination of a low pressure polyethylene ($\eta$ spec./c.=1.12) in carbon tetrachloride to a chlorine content of 43%) in 92.9 parts of carbon tetrachloride. As soon as an emulsion has formed, the organic solvent is distilled off at 65° C. Towards the end of the operation it is necessary to raise the temperature to 90° C. Simultaneously with 7000 parts of carbon tetrachloride, 500 parts of water distill off. In case foams occur they are broken by small amounts of silicone oil. The suspension thus obtained of powdery polyvinyl chloride and chloropolyolefin is suction filtered, washed and dried at 60° C.

*Example 2*

500 parts of a polyvinyl chloride latex with a solid content of 40% are added dropwise at room temperature to 500 parts of a calcium chloride solution of 1% strength. In order to obtain an emulsion the product thus obtained is mixed by stirring with 500 parts of a solution of carbon tetrachloride containing 15% by weight of chlorinated high pressure polyethylene having a chlorine content of 43.5%. The organic solvent is then distilled off as described in Example 1 and the aqueous suspension of the powdery plastic composition is washed and dried as usual.

*Example 3*

To a suspension of 100 parts of powdery polyvinyl chloride having a K-value of 73 and 5 parts of sodium sulfonate containing 12 carbon atoms in 200 parts of distilled water there is slowly added dropwise a solution of 30 parts of chlorinated low pressure polyethylene having a chlorine content of 49% in 150 parts of carbon tetrachloride and 100 parts of chloroform. The emulsion thus obtained is introduced dropwise into a vessel provided with a stirrer and filled with hot water of 90° C. whereby the plasticized polyvinyl resin separates in the form of a powder while the solvent simultaneously distills off.

*Example 4*

The process is carried out as described in Example 3 but instead of 30 parts of a chlorinated low pressure polyethylene there are used 30 parts of a chlorinated and sulfochlorinated polyethylene having a chlorine content of 44% and a sulfur content of 1.5%.

*Example 5*

To the solution of a chlorinated copolymer having a solid content of 80 parts and a chlorine content of 36.8% which has been obtained by chlorinating the more readily soluble modification of a copolymer of ethylene and propylene in a ratio of 90:10 ($\eta$ spec./c.=1.0, determined at 130° C. as a solution of 0.5% strength in tetrahydronaphthalene) there are added, after having eliminated the dissolved chlorine and hydrochloric acid, 5 parts of a known and usual tin stabilizer and the mixture is then stirred with 500 parts of latex (solid content 40% of polyvinyl chloride). The emulsion thus obtained is then introduced dropwise into a vessel provided with a stirrer and filled with a calcium chloride solution of 1% strength having a temperature of 90° C. The solvent distills off and simultaneously the latex precipitates whereby a very fine powder is formed which settles at the bottom and which is discharged.

We claim:
1. A process for the manufacture of a plasticized resin composition, which comprises admixing (1) a solution of a rubbery polymer in an organic solvent, said rubbery polymer being selected from the group consisting of a chlorinated polyethylene, a sulfochlorinated polyethylene, a chlorinated polypropylene, a sulfochlorinated polypropylene, a chlorinated copolymer of ethylene and propylene, and a sulfochlorinated copolymer of ethylene and propylene, with (2) an aqueous emulsion of a member selected from the group consisting of polyvinyl chloride, polyvinylidene chloride, and copolymers of a predominant amount of vinyl chloride and a monoolefinic monomer, subsequently removing the organic solvent, separating the residual water from the resin and recovering a non-sticky powder of uniform grain size which is a blend of both polymers.

2. Process of claim 1 wherein the organic solvent is distilled off under reduced pressure.

3. A process for the manufacture of a plasticized resin composition, which comprises admixing (1) a solution of a rubbery polymer in an organic solvent, said rubbery polymer being selected from the group consisting of a chlorinated polyethylene, a sulfochlorinated polyethylene, a chlorinated polypropylene, a sulfochlorinated polypropylene, a chlorinated copolymer of ethylene and propylene, and a sulfochlorinated copolymer of ethylene and propylene, with (2) a member selected from the group consisting of polyvinyl chloride, polyvinylidene chloride, and copolymers of a predominant amount of vinyl chloride and a monoolefinic monomer; eliminating the solvent by atomization with a hot gas and recovering a non-sticky powder of uniform grain size which is a blend of both polymers.

4. Process for the manufacture of a plasticized resin composition which comprises admixing a solution of (1) a rubbery polymer in an organic solvent, said rubbery polymer being selected from the group consisting of a chlorinated polyethylene, a sulfochlorinated polyethylene, a chlorinated polypropylene, a sulfochlorinated polypropylene, a chlorinated copolymer of ethylene and propylene, and a sulfochlorinated copolymer of ethylene and propylene, with (2) an aqueous emulsion of a member selected from the group consisting of polyvinyl chloride, polyvinylidene chloride, and copolymers of a predominant amount of vinyl chloride and a monoolefinic monomer, and subsequently precipitating the plasticized resin composition at elevated temperature by the addition of a salt selected from the group consisting of alkaline earth metal chlorides and heavy metal chlorides, distilling off the solvent and recovering a non-sticky powder of uniform grain size which is a blend of both polymers.

5. The process of claim 1 wherein said organic solvent is eliminated by introducing the mixture of aqueous emulsion and polymer solution into a hot aqueous medium while stirring.

References Cited in the file of this patent

UNITED STATES PATENTS

| 2,230,000 | Hauffe et al. | Jan. 28, 1941 |
| 2,592,763 | Taylor | Apr. 15, 1952 |
| 2,668,157 | Emig et al. | Feb. 2, 1954 |
| 2,779,754 | Erchak | Jan. 29, 1957 |

FOREIGN PATENTS

| 1,143,244 | France | Apr. 7, 1957 |
| 486,628 | Canada | Sept. 16, 1952 |